Patented Mar. 8, 1927.

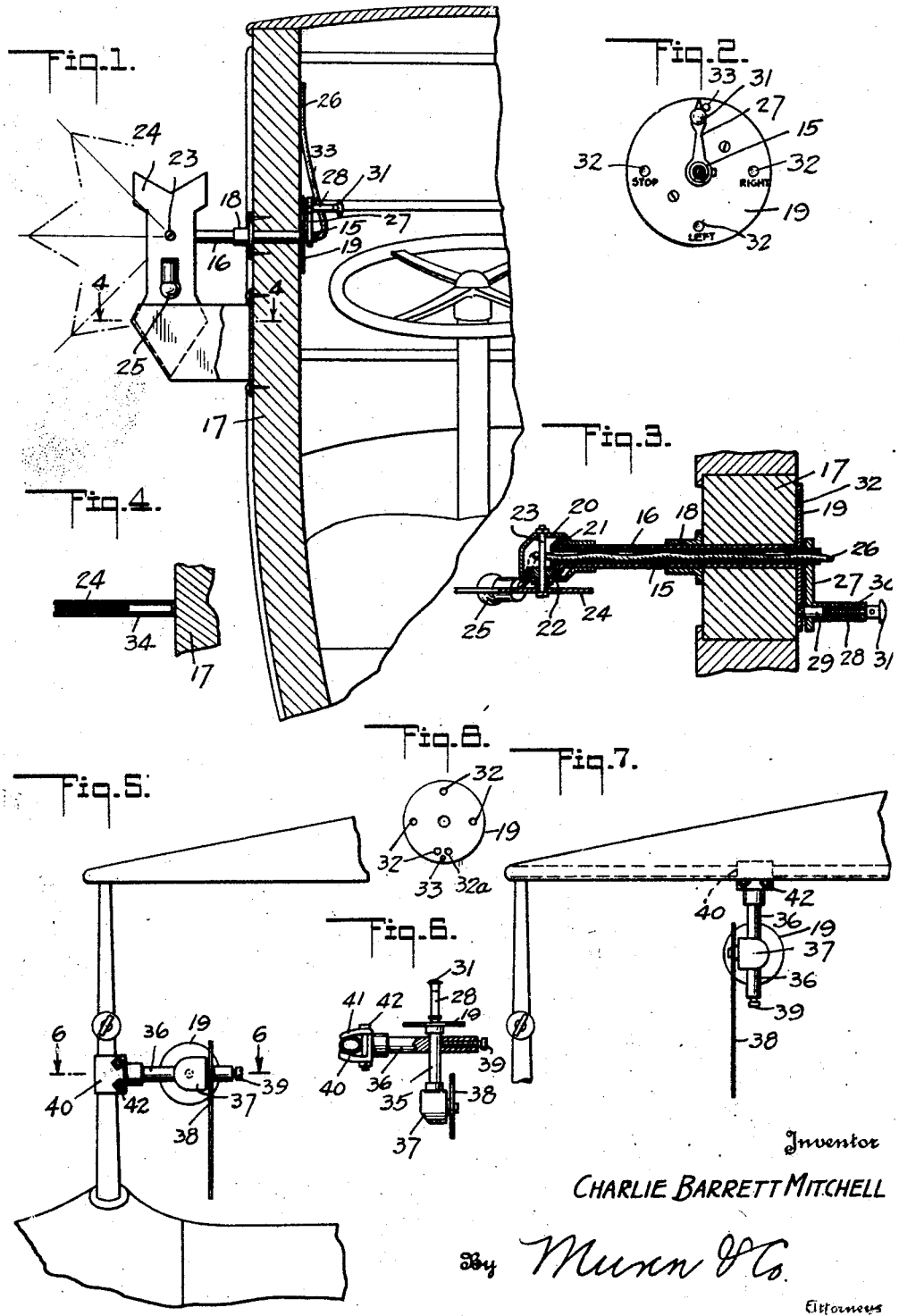

1,620,379

UNITED STATES PATENT OFFICE.

CHARLIE BARRETT MITCHELL, OF LOS ANGELES, CALIFORNIA.

DIRECTION SIGNAL FOR MOTOR VEHICLES.

Application filed September 30, 1924. Serial No. 740,771.

My invention relates to direction signals for motor vehicles, and a purpose of my invention is the provision of a direction signal of extremely simple and inexpensive construction, which is capable of being readily applied to automobiles of either the open or closed body type and at various points on the open body vehicles.

It is also a purpose of my invention to provide a direction signal having a signaling arm mounted to occupy various indicating positions, manually rotatable means for moving the signaling arm to any of its indicating positions, and manually controllable means for securing the signaling arm in any of its indicating positions.

A further purpose of my invention is to provide a direction signal of the above described character in which the signaling arm and its actuating means are movable bodily to occupy various positions in order to permit of the application of the signal to various points on an automobile of the open body or touring type. Further, my invention includes a lamp incorporated in the signaling arm for illuminating the arm at night, such lamp being movable with the arm so that one may discern the position of the arm by the position of the lamp.

I will describe only two forms of direction signal embodying my invention, and will point out the novel features thereof in claim.

In the drawings

Figure 1 is a fragmentary view showing in vertical section an automobile of the closed body type having applied thereto one form of direction signal embodying my invention;

Figure 2 is a view showing the direction signal in end elevation;

Figure 3 is a horizontal sectional view of the signal arm shown in Figure 1;

Figure 4 is a fragmentary sectional view taken on the line 4—4 of Figure 1;

Figure 5 is a fragmentary view showing in side elevation an automobile of the touring type having applied thereto another form of direction signal embodying my invention;

Figure 6 is a horizontal sectional view taken on the line 6—6 of Figure 5;

Figure 7 is a view similar to Figure 5, showing the signal of Figures 5 and 6 applied to the top frame of the vehicle.

Figure 8 is a side elevation of the plate embodied in the signal shown in Figure 6 illustrating the arrangement of recesses.

Similar reference characters refer to similar parts in each of the several views.

Referring specifically to the drawings, and particularly to Figures 1 and 3, my invention in its present embodiment is shown as comprising a tubular shaft 15 rotatably mounted in a tubular housing 16, with the latter extending through the body post 17 and fixedly secured therein by means of a flanged collar 18 secured to the outer side of the post and a plate 19 secured to the inner side of the post. Supported upon the outer end of the housing 16 is a casing 20 adapted to enclose a beveled pinion 21 formed on or secured to the outer end of the shaft 15 and a second beveled pinion 22 fixed to a stub shaft 23 journaled in the casing and carrying at its outer end a signaling arm 24. The arm 24 in the present instance is in the form of an arrow and is provided with an opening in which an electric lamp 25 is mounted, and to which latter current is supplied from a suitable source (not shown), through the medium of conductors 26, which, as clearly shown in Figure 3, are extended through the tubular shaft 15 into the casing 20 and from the latter downwardly, where it is connected to the lamp.

The shaft 15 is adapted to be rotated in either direction through the medium of an arm 27 keyed or otherwise secured to the inner end of the shaft 15 so as to be movable over the plate 19. This arm 27 is provided with a right angular and tubular extension 28 in which a latch bolt 29 is slidably mounted and normally urged into engagement with the plate 19 by means of a spring 30. The outer end of the bolt 29 is provided with a head 31 which constitutes a handle adapted to be gripped by the operator for moving the arm 27 and for retracting the bolt 29 to allow movement of the arm 27, as will be more fully described hereinafter.

As clearly shown in Figure 2, the plate 19 is provided with recesses 32, in any one of which the inner end of the locking bolt 29 is adapted to repose for securing the arm 27, and consequently the shaft 15, against rotation. To limit the rotation of the shaft 15 so that the signaling arm 24 cannot be swung to the right from the position shown in Figure 1, or beyond the uppermost position which it is adapted to occupy as indicated in dash lines in Figure 1, a stop pin 23 extends from the plate 19 so as to be disposed in the path of movement of the arm 27 and thereby prevent the rotation of the arm in either direction.

With the direction signal in applied position to the closed body of the motor vehicle, as shown in Figure 1, it will be clear that the handle 31 is disposed within convenient reach of the driver to effect operation of the signaling arm 24. With the arm 27 in the position shown in Figure 2, wherein it engages the stop pin 33, the signaling arm 24 is in perpendicular position or in non-indicating position. In this position of the arm 27 the latch bolt 29 is in engagement with one of the notches 32 so that the signaling arm and its operating mechanism are held against actuation. However, when it is desired to move the signaling arm, the operator, by first retracting the bolt 29 out of engagement with the notch, can then rotate the arm 27, thereby effecting rotation of the shaft 15, the pinions 21 and 22, the shaft 23 and as a consequence the signaling arm 24. As indicated in dash lines in Figure 1, the signaling arm is capable of occupying any one of three signaling positions to indicate a stop, left hand turn or a right hand turn. The first position which the signaling arm will occupy when rotating the arm 27 will be the "stop" position, which is midway between the horizontal or left hand turn indicating position and the perpendicular or neutral position. The third position which the signaling arm can occupy is the right hand turn position shown in Figure 1, in which the arm is 45 degrees above the horizontal. As will be understood from a consideration of the legends on the plate shown in Figure 2, the arm 27 will occupy three different positions, and in each position the latch bolt will engage within the corresponding notch to secure the operating mechanism against movement and thus hold the signaling arm in the respective signaling position. In this manner a positive signaling indication can be given and maintained at will.

In order to partly conceal the signaling arm 24 when the latter is in neutral position and thus prevent misinterpretation of the signal, I have provided a shield 34, which, as shown in Figures 1 and 2, is secured to and extends from the post 17 which is provided with parallel portions between which the lower end of the arm is received.

Referring now to Figures 5 and 6, I have here shown another form of direction signal embodying my invention, in which a shaft housing 35 corresponding to the housing 16 extends through the arm 36 of a supporting bracket. At one end of the housing a casing 37 is formed corresponding to the casing 20 as in the first form of my invention, and the casing and housing are adapted to receive the same mechanism for actuating a signaling arm 37. The arm 38 corresponds in construction to the signaling arm 24, with the exception that it is not provided with an opening for the reception of a lamp. The means for actuating the mechanism for moving the signaling arm is the same as in the first form of my invention and is all mounted on the housing 35. This housing is rotatably mounted in the arm 36 so that the entire signal can be moved to occupy various positions with respect to the supporting arm 36 and held in any of such positions by means of a set screw 39 which as shown in Figure 6, is threaded in one end of the arm 36 so as to engage the housing 35.

Formed on one end of the arm 36 is a clamp including a stationary jaw 40 and an adjustable jaw 41, the latter being moved to and held in clamping relation with respect to the stationary jaw by means of a bolt 42.

In Figure 5 I have shown the direction signal applied to the windshield frame, the jaws 40 and 41 of the clamp receiving and gripping the vertical portion of the frame so as to hold the arm 36 in a horizontal position so that it extends rearwardly from the frame. The housing 35, together with the mechanism associated therewith, is adjusted so that the signaling arm 38 in neutral position is disposed downwardly at one side of the vehicle. Thus by rotating the shaft in the housing from the handle 31 the signaling arm can be moved to any one of the three indicating positions, as has been described in connection with the signal shown in Figure 1.

Referring now to Figure 7, I have shown a separate form of direction signal applied to the top frame of a motor vehicle so that the arm 36 depends from the frame to support the signaling arm and actuating mechanism. In this adaptation the housing 35 is rotated to a 90 degree position from that which it occupied in Figure 5, whereby the arm 27 must be rotated in a direction reverse to that described in connection with the arm shown in Figure 2 in order to move the signaling arm from the neutral position upwardly to the three indicating positions. In order to adapt the signal to this reversal of movement the plate 19 is provided with an additional notch 32ª, which, as shown in Figure 8, is disposed at one side of the stop pin 33.

Although I have herein shown and described only two forms of direction signals for automobiles embodying my invention, it is to be understood that various changes and modifications may be made herein without departing from the spirit of the invention and the spirit and scope of the appended claim.

I claim:

A direction signal comprising a shaft housing, a flanged collar secured to the housing intermediate its ends and adapted to be secured to the body post of a motor vehicle, a tubular shaft rotatably mounted in the housing through which a conducting wire is adapted to extend, said shaft projecting beyond opposite ends of the housing, a pinion fixed to the outer end of the shaft, a casing enclosing the pinion and secured to the outer end of the housing, a stub shaft rotatably mounted in the casing at an angle to the first shaft, a pinion fixed to the stub shaft within the casing and meshing with the first pinion, a signaling arm fixed to the stub shaft and having an opening in which a lamp is adapted to be received so as to be visible from both sides of the arm, means for actuating the first shaft to effect movement of the arm to occupy any one of a plurality of signaling positions and a non-signaling position, and a shield of U shaped cross section adapted to be secured to the body post and in which a portion of the arm is received and concealed when the arm occupies its non-signaling position.

CHARLIE BARRETT MITCHELL.